US006451920B1

(12) United States Patent
Harrison et al.

(10) Patent No.: US 6,451,920 B1
(45) Date of Patent: Sep. 17, 2002

(54) PROCESS FOR MAKING POLYALKYLENE/MALEIC ANHYDRIDE COPOLYMER

(75) Inventors: James J. Harrison, Novato, CA (US); William R. Ruhe, Jr., Benecia, CA (US)

(73) Assignee: Chevron Chemical Company LLC, San Francisco, CA (US)

( * ) Notice: Subject to any disclaimer, the term of this patent is extended or adjusted under 35 U.S.C. 154(b) by 0 days.

(21) Appl. No.: 09/437,347

(22) Filed: Nov. 9, 1999

(51) Int. Cl.[7] ............... C08F 8/00; C08F 8/46
(52) U.S. Cl. ............... 525/327.4; 525/327.5; 525/327.6; 525/337; 525/340
(58) Field of Search ............... 525/301, 327.4, 525/327.7, 329.7, 327.5, 327.6, 337, 340

(56) References Cited

U.S. PATENT DOCUMENTS

| | | | |
|---|---|---|---|
| 3,447,978 A | 6/1969 | Bluhm ............... 149/2 |
| 3,765,964 A | 10/1973 | Wade ............... 149/2 |
| 3,985,593 A | 10/1976 | Machacek ............... 149/62 |
| 4,008,110 A | 2/1977 | Machacek ............... 149/46 |
| 4,097,316 A | 6/1978 | Mullay ............... 149/2 |
| 4,104,092 A | 8/1978 | Mullay ............... 149/2 |
| 4,218,272 A | 8/1980 | Brockington ............... 149/21 |
| 4,235,786 A | * 11/1980 | Wisotsky ............... 562/595 |
| 4,259,977 A | 4/1981 | Brockington ............... 137/13 |
| 4,357,184 A | 11/1982 | Binet et al. ............... 149/2 |
| 4,371,408 A | 2/1983 | Fillman ............... 149/21 |
| 4,391,659 A | 7/1983 | Smith ............... 149/2 |
| 4,404,050 A | 9/1983 | Yorke et al. ............... 149/2 |
| 4,409,044 A | 10/1983 | Bhattacharyya et al. ............... 149/2 |
| 4,448,619 A | 5/1984 | Mitchell ............... 149/21 |
| 4,453,989 A | 6/1984 | Mullay ............... 149/21 |
| 4,534,809 A | 8/1985 | Takeuchi et al. ............... 149/3 |
| 5,112,507 A | 5/1992 | Harrison ............... 252/51.5 A |
| 5,175,225 A | * 12/1992 | Ruhe, Jr. ............... 526/272 |
| 5,565,528 A | 10/1996 | Harrison et al. ............... 525/327.6 |
| 5,616,668 A | 4/1997 | Harrison et al. ............... 526/271 |
| 5,792,729 A | * 8/1998 | Harrison et al. ............... 508/192 |
| 5,920,031 A | 7/1999 | Jahnke ............... 149/2 |
| 6,015,776 A | 1/2000 | Harrison et al. ............... 508/192 |
| 6,107,450 A | 8/2000 | Harrison et al. ............... 528/329.1 |
| 6,156,850 A | 12/2000 | Harrison et al. ............... 525/329.6 |

* cited by examiner

*Primary Examiner*—Jeffrey Mullis
(74) *Attorney, Agent, or Firm*—Richard J. Sheridan; Linda A. Stokley; Josetta I. Jones

(57) ABSTRACT

A process is provided for preparing a mixture of (1) a copolymer of a polyalkene and an unsaturated acidic reagent and (2) a polyalkenyl derivative of an unsaturated acidic reagent, said process comprising (a) copolymerizing (1) a polyalkene containing alkylvinylidene isomer and non-alkylvinylidene isomers and (2) an unsaturated acidic reagent under polymerization conditions in the presence of a free radical initiator; and (b) reacting the product of step (a) with an unsaturated acidic reagent at elevated temperature in the presence of a strong acid.

The product of the process can be used to make polysuccinimides that are useful in lubricating oil compositions.

30 Claims, No Drawings

PROCESS FOR MAKING POLYALKYLENE/MALEIC ANHYDRIDE COPOLYMER

The present invention relates to an improved process for making a copolymer of a polybutene with an unsaturated acidic reagent.

BACKGROUND OF THE INVENTION

Copolymers prepared from polyisobutene and maleic anhydride are known. These copolymers are sometimes referred to as "polyPIBSA". They can be prepared by copolymerizing a polybutene containing a high concentration of the methylvinylidene isomer (along with other polybutene isomers) with an unsaturated acidic reagent such as maleic anhydride using a free radical initiator. Apparently, only the methylvinylidene isomer reacts. If the polybutene contains, e.g., 70 mole percent methylvinylidene isomer, then only 70% conversion to copolymer can be achieved. This results in a less than optimum use of the polybutene starting material.

In order to improve the conversion of the polybutene starting material and improve raw material utilization, it has been found that if the polyPIBSA reaction mixture is further reacted with the unsaturated acidic reagent in the presence of a strong acid catalyst, such as a sulfonic acid catalyst, the unreacted polybutene can be converted to polyisobutenyl succinic anhydride. Up to 90–95% conversion of the starting polybutene can be achieved in this way. The resulting product is a mixture of polyPIBSA and acid-catalyzed thermal PIBSA.

The resulting mixture of polyPIBSA and acid-catalyzed thermal PIBSA can then be reacted with amines to form succinimides which can be post-treated with ethylene carbonate, boric acid and the like. These products are excellent ashless dispersants for lubricants with outstanding deposit inhibiting properties, and excellent soot thickening properties, and are also useful as fuel additives.

SUMMARY OF THE INVENTION

The present invention provides a process for preparing a mixture of (1) a copolymer of a polyalkene and an unsaturated acidic reagent and (2) a polyalkenyl derivative of an unsaturated acidic reagent, said process comprising:

(a) copolymerizing (1) a polyalkene containing alkylvinylidene isomer and non-alkylvinylidene isomers and (2) an unsaturated acidic reagent under polymerization conditions in the presence of a free radical initiator; and (b) reacting the product of step (a) with an unsaturated acidic reagent at elevated temperature in the presence of a strong acid.

Preferably, the polyalkene is a polybutene. More preferably, the polybutene is a polyisobutene, most preferably wherein at least 50% of said polyisobutene has methylvinylidene end groups. Preferably, the polyalkene has a Mn of from 500 to 2500.

Preferably, the unsaturated acidic reagent is maleic anhydride.

Preferably, the mole ratio of unsaturated acidic reagent to polyalkene is at least 1.0:1.

Preferably, the strong acid is an oil-soluble, strong organic acid, having a $pK_a$ of less than about 4. More preferably, it is a sulfonic acid, such as an alkyl benzene sulfonic acid, wherein the alkyl group has from 4 to 30 carbon atoms. Preferably, the sulfonic acid is present in an amount in the range of from 0.0025% to 1.0% based on the total weight of polyalkene.

The present invention further provides the product produced by a process comprising:

(a) copolymerizing (1) a polyalkene containing alkylvinylidene isomer and non-alkylvinylidene isomers and (2) an unsaturated acidic reagent under polymerization conditions in the presence of a free radical initiator; and (b) reacting the product of step (a) with an unsaturated acidic reagent at elevated temperature in the presence of a strong acid.

Also provided by the present invention is a composition comprising a mixture of (1) a copolymer of a polyalkene and an unsaturated acidic reagent and (2) a polyalkenyl derivative of an unsaturated acidic reagent wherein the weight ratio of copolymer to polyalkenyl derivative is about 0.1–10. This mixture is referred to herein as a "polyPIBSA/acid-catalyzed thermal PIBSA mixture".

Further provided by the present invention is a polysuccinimide prepared by reacting a polyPIBSA/acid-catalyzed thermal PIBSA mixture of the present invention with an amine, a polyamine having at least two basic nitrogens, or mixture thereof. The present invention also provides a concentrate comprising 10 to 90 weight percent of such a polysuccinimide and from 90 to 10 weight percent of an organic diluent. In addition, the present invention provides a lubricating oil composition comprising a major amount of an oil of lubricating viscosity and a minor amount of such a polysuccinimide. Also provided by the present invention is a post-treated composition prepared by treating such a polysuccinimide under reactive conditions with a cyclic carbonate. Further provided by the present invention is a post-treated composition prepared by treating such a polysuccinimide under reactive conditions with a boron compound.

The present invention further provides a lubricating oil composition comprising a major amount of an oil of lubricating viscosity and a minor amount of the post-treated composition. Also provided by the present invention is a concentrate comprising 20 to 60 weight percent of the post-treated composition and from 80 to 40 weight percent of an organic diluent.

Also provided by the present invention is a fuel composition comprising a hydrocarbon boiling in the gasoline or diesel range and from about 10 to about 10,000 parts per million of post-treated composition of this invention. Further provided is a fuel concentrate comprising an inert, stable oleophilic solvent boiling in the range of 150–400° F. and at least 5 percent by weight of the post-treated composition of this invention.

DETAILED DESCRIPTION OF THE INVENTION

The process comprises the steps of copolymerizing a polyalkene and an unsaturated acidic reagent, followed by reacting any unreacted polyalkene with the unsaturated acidic reagent at elevated temperature in the presence of a strong acid. The polyalkene comprises a mixture of alkylvinylidene and non-alkylvinylidene isomers. It is believed that the alkylvinylidene isomers participate primarily in the copolymerization reaction, and that any alkylvinylidene isomers remaining after the copolymerization reaction plus the non-alkylvinylidene isomers participate primarily in the second reaction.

THE POLYALKENE

The polyalkene can be a polymer of a single type of olefin or it can be a copolymer of two or more types of olefins. It contains both alkylvinylidene isomer and non-alkylvinylidene isomers. Preferably, the polyalkene is a polybutene, more preferably a polyisobutene, and most preferably a polyisobutene wherein at least 50%, but less than 100%, of the polyisobutene has methylvinylidene end groups. Preferably, the polyalkene has a number average molecular weight (Mn) of from about 500 to about 2500.

The polyalkene can also be used in combination with a 1-olefin (also known as an "alpha-olefin"). The 1-olefin typically has five or more carbon atoms, preferably about 10 to about 30 carbon atoms. U.S. Pat. No. 5,792,729, issued Aug. 11, 1998 to Harrison and Ruhe, discloses the preparation of terpolymers made from a polyalkene, a 1-olefin, and an unsaturated acidic reagent and is incorporated herein by reference in its entirety.

THE UNSATURATED ACIDIC REAGENT

The term "unsaturated acidic reagent" refers to maleic or fumaric reactants of the general formula:

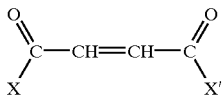

wherein X and X' are the same or different, provided that at least one of X and X' is a group that is capable of reacting to esterify alcohols, form amides, or amine salts with ammonia or amines, form metal salts with reactive metals or basically reacting metal compounds and otherwise function as acylating agents. Typically, X and/or X' is —OH, —O—hydrocarbyl, —OM$^+$ where M$^+$ represents one equivalent of a metal, ammonium or amine cation, —NH$_2$, —Cl, —Br, and taken together X and X' can be —O— so as to form an anhydride. Preferably, X and X' are such that both carboxylic functions can enter into acylation reactions. Maleic anhydride is a preferred unsaturated acidic reactant. Other suitable unsaturated acidic reactants include electron-deficient olefins such as monophenyl maleic anhydride; monomethyl, dimethyl, monochloro, monobromo, monofluoro, dichloro and difluoro maleic anhydride, N-phenyl maleimide and other substituted maleimides; iso-maleimides; fumaric acid, maleic acid, alkyl hydrogen maleates and fumarates, dialkyl fumarates and maleates, fumaronilic acids and maleanic acids; and maleonitrile, and fumaronitrile.

THE STRONG ACID

The term "strong acid" refers to an acid having a pK$_a$ of less than about 4, preferably −10 to less than +4, more preferably −3 to +2. Preferably, the strong acid is an oil-soluble, strong organic acid. Representative classes of the oil-soluble strong acids are represented by maleic acid, malonic acid, phosphoric acid, thiophosphoric acids, phosphonic acid, thiophosphonic acids, sulfonic acids, sulfuric acid, and alpha-substituted or nitrilocarboxylic acids wherein the oil-solubilizing group or groups are hydrocarbyl and contain from 10 to 76, preferably from 24 to 40, more preferably from 28 to 36 carbon atoms, and the aryl group is preferably phenyl.

Preferably, the strong acid is a sulfonic acid. Still more preferably, the sulfonic acid is an alkyl aryl sulfonic acid. Most preferably, the alkyl group of said alkyl aryl sulfonic acid has from 4 to 30 carbon atoms.

Preferably, the sulfonic acid is present in an amount in the range of from 0.0025% to 1.0% based on the total weight of polyalkene.

COPOLYMERIZATION CONDITIONS

U.S. Pat. No. 5,112,507, issued May 12, 1992 to Harrison, discloses copolymerization conditions useful in the practice of this invention, and is incorporated by reference herein in its entirety. In general, the copolymerization reaction may be conducted at a temperature of about −30° C. to about 210° C., and preferably from about 40° C. to about 180° C. The degree of polymerization is inversely proportional to temperature. Accordingly, it may be advantageous to employ lower reaction temperatures. For example, if the reaction is conducted at about 138° C., an average degree of polymerization of about 1.3 is obtained. However, if the reaction is conducted at a temperature of about 40° C., an average degree of polymerization of about 10.5 is obtained.

The polyPIBSA can have an apparent succinic ratio greater than 1.3, such as those disclosed in U.S. Pat. No. 5,565,528, issued Oct. 15, 1996 to Harrison and Ruhe, which is incorporated herein by reference in its entirety.

The reaction may be conducted neat, that is, the polyalkene, the unsaturated acidic reactant and the free radical initiator are combined in the proper ratio and then stirred at the reaction temperature. The unsaturated acidic reagent may be added over time, or all at once.

Alternatively, the reaction may be conducted in a diluent. For example, the reactants may be combined in a solvent. Suitable solvents include those in which the reactants and the free radical initiator are soluble and include acetone, tetrahydrofuran, chloroform, methylene chloride, dichloroethane, toluene, dioxane, chlorobenzene, xylenes and the like. PIBSA, polyPIBSA or mixtures thereof may also be used as a solvent for the reaction. See U.S. Pat. No. 5,175,225, issued Dec. 29, 1992 to Ruhe, which is incorporated herein by reference in its entirety. Depending upon the particular solvent employed, it may or may not enter into the reaction as a chain transfer agent. After the reaction is complete, volatile components may be stripped off.

In general, the copolymerization can be initiated by any free radical initiator. Such initiators are well known in the art. However, the choice of the free radical initiator may be influenced by the reaction temperature employed.

The preferred free radical initiators are the peroxide-type polymerization initiators and the azo-type polymerization initiators. Radiation can also be used to initiate the reaction, if desired.

The peroxide-type initiator can be organic or inorganic, the organic having the general formula R$^3$OOR$^{3'}$ where R$^3$ is any organic radical and R$^{3'}$ is selected from the group consisting of hydrogen and any organic radical. Both R$^3$ and R$^{3'}$ can be organic radicals, preferably hydrocarbon, aryl and acyl radicals, carrying, if desired, substituents such as halogens. Preferred peroxides include di-tert-butyl peroxide, tert-butyl peroxybenzoate and dicumyl peroxide.

Examples of other peroxides, which in no way are limiting, include benzoyl peroxide, lauroyl peroxide, other tertiary butyl peroxides, 2,4-dichloro-benzoyl peroxide, tertiary butyl hydroperoxide, cumene hydroperoxide, diacetyl peroxide, acetyl hydroperoxide, diethylperoxycarbonate, tertiary butyl perbenzoate and the like.

The azo-type compounds, typified by alpha, alpha'-azobisisobutyronitrile, are also well known free radical promoting materials. The azo compounds can be defined as those having present in the molecule group —N=N— wherein the balances are satisfied by organic radicals, at least one of which is preferably attached to a tertiary carbon. Other suitable azo compounds include, but are not limited to, p-bromobenzenediazonium fluoroborate, p-tolyidiazoaminobenzene, p-bromobenzenediazonium hydroxide, azomethane, and phenyldiazonium halides. A suitable list of azo-type compounds can be found in U.S. Pat. No. 2,551,813, issued May 8, 1951 to Pinkney, which is incorporated herein by reference in its entirety.

The amount of initiator to employ, exclusive of radiation, of course, depends to a large extent on the particular initiator chosen, the polyalkene used and the reaction conditions. The initiator must, of course, be soluble in the reaction medium. The usual concentrations of initiator are between 0.001:1 and 0.2:1 moles of initiator per mole of acidic reactant, with preferred amounts between 0.005:1 and 0.10:1.

The polymerization temperature must be sufficiently high to break down the initiator to produce the desired free-radicals. For example, using benzoyl peroxide as the initiator, the reaction temperature can be between about 75° C. and about 90° C., preferably between about 80° C. and about 85° C. Higher and lower temperatures can be employed, a suitable broad range of temperatures being between about 20° C. and about 200° C., with preferred temperatures between about 50° C. and about 180° C.

The reaction pressure should be sufficient to maintain the solvent in the liquid phase. Pressures can therefore vary between about atmospheric and 100 psig or higher, but the preferred pressure is atmospheric.

The reaction time is usually sufficient to result in the substantially complete conversion of the acidic reactant and high molecular weight olefin to copolymer. The reaction time is suitable between one and 24 hours, with preferred reaction times between two and ten hours.

As noted above, the subject reaction is a solution-type polymerization reaction. The high molecular weight olefin, acidic reactant, solvent and initiator can be brought together in any suitable manner. The important factors are intimate contact of the high molecular weight olefin and acidic reactant in the presence of a free-radical producing material. The reaction, for example, can be conducted in a batch system where the high molecular weight olefin is added all initially to a mixture of acidic reactant, initiator and solvent or the high molecular weight olefin can be added intermittently or continuously to the reaction pot. Alternatively, the reactants may be combined in other orders, for example, acidic reactant and initiator may be added to high molecular weight olefin and solvent in the reaction pot. In another manner, the components in the reaction mixture can be added continuously to a stirred reactor with continuous removal of a portion of the product to a recovery train or to other reactors in series. The reaction can also suitably take place in a coil-type reactor where the components are added at one or more point along the coil.

THE PROCESS FOR PREPARING POLYALKENYL DERIVATIVES

In the preparation of the polyalkenyl derivative, the mole ratio of unsaturated acidic reagent to polyalkene is preferably at least 1.0:1. More preferably, that mole ratio is from 1.0:1 to 4.0:1.

Preferably, the unsaturated acidic reagent is added over a period of time period (such as from ½ to 3 hours) or all at once.

The reaction is conducted with an excess of unsaturated acidic reagent at elevated temperatures in the presence of a strong acid to convert at least some of the unreacted polyalkene to additional polyalkenyl derivative of an unsaturated acidic reagent. This reaction is an ene reaction, not polymerization. The product of this reaction is referred to herein as "acid-catalyzed thermal PIBSA".

The temperature of the reaction in the second step (the ene reaction) can vary over a wide range. Preferably, the temperature is in the range of from 180° to 240° C. The pressure can be atmospheric, sub-atmospheric, or super-atmospheric. Preferably, the pressure is super-atmospheric.

When the reaction is complete, the unreacted unsaturated acidic reagent is removed. Preferably, the reaction medium is cooled as soon as the unreacted unsaturated acidic reagent has been removed. The reaction product may contain some tar or resin which is believed to be polymaleic anhydride by-product. The insoluble portion of this by-product can be removed by filtration, but some may remain in the product as a soluble resin.

By using the two step process of this invention, conversion of the polyalkene can be as high as 90–95%. This has the advantage that it minimizes the amount of unreacted polyalkene in the final reaction product. Unreacted polyalkene tends to increase the viscosity of a dispersant at constant nitrogen levels, often requiring the addition of a low viscosity diluent oil. The present invention permits the use of less (or no) diluent oil, as well as providing higher utilization of the polyalkene.

PROCESS FOR PREPARING POLYSUCCINIMIDES

A polysuccinimide can be prepared by reacting the polyPIBSA/acid-catalyzed thermal PIBSA mixture produced by the present invention with either an amine or a polyamine, under reactive conditions. The amine or polyamine should be employed in amounts such that there are 0.1 to 1.5 equivalents of amine or polyamine per equivalent of acidic groups in the polyPIBSA/acid-catalyzed thermal PIBSA mixture. Preferably, a polyamine is used having at least three nitrogen atoms and 4 to 20 carbon atoms.

It may be desirable to conduct the reaction in an inert organic solvent. Optimum solvents will vary and can be determined from literature sources or routine experiments. Typically, the reaction is conducted at temperatures in the range of from about 60° C. to 180° C., preferably 150° C. to 170° C. for from about 1 to 10 hours, preferably 2 to 6 hours. Typically, the reaction is conducted at about atmospheric pressure; however, higher or lower pressures can also be used depending on the reaction temperature desired and the boiling point of the reactants or solvent.

Water, present in the system or generated by this reaction, is preferably removed from the reaction system during the course of the reaction via azeotroping or distillation. After reaction completion, the system can be stripped at elevated temperatures (typically 100° C. to 250° C.) and reduced pressures to remove any volatile components that may be present in the product.

An amine or, preferably, a polyamine is used. Preferably, the polyamine has at least three amine nitrogen atoms per molecule, and more preferably, 4 to 12 amine nitrogens per molecule. Most preferred are polyamines having from about 6 to 10 nitrogen atoms per molecule.

Preferred polyalkene polyamines also contain from about 4 to 20 carbon atoms, preferably from 2 to 3 carbon atoms per alkylene unit. The polyamine preferably has a carbon-to-nitrogen ratio of from 1:1 to 10:1.

Examples of suitable polyamines that can be used to form the succinimides of this invention include the following:

tetraethylene pentamine, pentaethylene hexamine, Dow E-100 heavy polyamine ($M_n$=303, available from Dow Chemical Company), and Union Carbide HPA-X heavy polyamine ($M_n$=275, available from Union Carbide Corporation). Such polyamines encompass isomers, such as branched-chain polyamines, and substituted polyamines, including hydrocarbyl-substituted polyamines. HPA-X heavy polyamine contains an average of approximately 6.5 amine nitrogen atoms per molecule.

The polyamine reactant may be a single compound, but typically will be a mixture of compounds reflecting commercial polyamines. Typically, the commercial polyamine will be a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be largely tetraethylene pentamine and the empirical formula of the total amine composition will closely approximate that of tetraethylene pentamine.

Other examples of suitable polyamines include admixtures of amines of various molecular weights. Included are mixtures of diethylene triamine and heavy polyamine. A preferred polyamine admixture is a mixture containing 20% by weight diethylene triamine and 80% by weight heavy polyamine.

If an amine, i.e., a monoamine, is employed, it should be a primary amine, secondary amine, or mixture thereof. Preferably, the amine will have at least 10 carbon atoms, more preferably between 12 and 18 carbon atoms. Although aromatic amines may be employed, it is preferred to use aliphatic amines. Both saturated and unsaturated amines may be employed. Preferred amines include aliphatic primary amines. Examples of suitable amines include, but are not limited to, octadecylamine and dodecylamine. An example of a suitable mixture of amines is tallowamine (a partially saturated mixture of amines comprised mainly of $C_{18}$ amines).

Mixtures of monoamines and polyamines may be used. Also, polyoxyalkylene polyamines (for example, materials supplied under the trade name Jeffamine) and aminoalcohols can also be suitably used.

PROCESS FOR PREPARING POLYESTERS

Polyesters can be prepared by reacting the polyPIBSA/ acid-catalyzed thermal PIBSA mixture produced by the present invention with a polyol, under reactive conditions. The polyols have the formula R"(OH)$_x$ where R" is a hydrocarbon radical and x is an integer representing the number of hydroxy radicals and has a value of from 2 to about 10. The polyols preferably contain less than 30 carbon atoms, and have from 2 to about 10, preferably 3 to 6, hydroxy radicals. They are illustrated by, for example, alkylene glycols and poly(oxyalkylene) glycols such as ethylene glycol, di(ethylene glycol), tri(ethylene glycol), di(propylene glycol), tri(butylene glycol), penta(ethylene glycol), and other poly(oxyalkylene) glycols formed by the condensation of two or more moles of ethylene glycol, propylene glycol, octylene glycol, or a like glycol having up to 12 carbon atoms in the alkylene radical. Other useful polyhydric alcohols include glycerol, pentaerythritol, 2,4-hexanediol, pinacol, erythritol, arabitol, sorbitol, mannitol, 1,2-cyclohexanediol, xylylene glycol, and 1,3,5-cyclohexanetriol. Other useful polyols are disclosed in U.S. Pat. No. 4,034,038, issued Jul. 5, 1977 to Vogel, which is incorporated by reference in its entirety.

Esterification can be effected at a temperature of about 100° C. to about 180° C., preferably about 150° C. to about 160° C. Ordinarily, the reaction is carried out at substantially atmospheric pressure, although pressures above atmospheric may be employed with more volatile reactants. Usually, stoichiometric amounts of reactants are employed. The reaction may be run in the absence of a catalyst, or in the presence of an acid-type catalyst such as mineral acids, sulfonic acids, Lewis type acids and the like. Suitable reaction conditions and catalysts are disclosed in U.S. Pat. No. 3,155,686, issued Nov. 3, 1964 to Prill et al., which is incorporated by reference in its entirety.

POST-TREATMENT OF POLYSUCCINIMIDES

The dispersancy of the compositions of this invention is generally further improved by reaction with a cyclic carbonate. The resulting post-treated product has one or more nitrogens of the polyamino moiety substituted with a hydroxy hydrocarbyl oxycarbonyl, a hydroxy poly (oxyalkylene) oxycarbonyl, a hydroxyalkylene, hydroxyalkylenepoly(oxyalkylene), or mixture thereof.

The cyclic carbonate post-treatment is conducted under conditions sufficient to cause reaction of the cyclic carbonate with secondary amino groups of the polyamino substituents. Typically, the reaction is conducted at temperatures of about 0° C. to 250° C., preferably from 100° C. to 200° C. Generally, best results are obtained at temperatures of from about 150° C. to 180° C.

The reaction may be conducted neat, and may or may not be conducted in the presence of a catalyst (such as an acidic, basic or Lewis acid catalyst). Depending on the viscosity of the reactants, it may be desirable to conduct the reaction using an inert organic solvent or diluent, e.g., toluene or xylene. Examples of suitable catalysts include phosphoric acid, boron trifluoride, alkyl or aryl sulfonic acid, and alkali or alkaline earth carbonate.

A particularly preferred cyclic carbonate is 1,3-dioxolan-2-one (ethylene carbonate) because it affords excellent results and also because it is readily available commercially.

The molar charge of cyclic carbonate employed in the post-treatment reaction is preferably based upon the theoretical number of basic nitrogen atoms contained in the polyamino substitutent of the succinimide. Thus, when one equivalent of tetraethylene pentamine is reacted with two equivalents of succinic anhydride, the resulting bis-succinimide will theoretically contain three basic nitrogen atoms. Accordingly, a molar charge ratio of 2 would require that two moles of cyclic carbonate be added for each basic nitrogen, or in this case 6 moles of cyclic carbonate for each mole equivalent of succinimide. Mole ratios of the cyclic carbonate to the basic amine nitrogen are typically in the range of from about 1:1 to about 4:1; preferably from about 2:1 to about 3:1.

The polysuccinimide composition of this invention, including the post-treated compositions described above, can also be reacted with boric acid or a similar boron compound to form borated dispersants having utility within the scope of this invention. In addition to boric acid, examples of suitable boron compounds include boron oxides, boron halides and esters of boric acid. Generally, from about 0.1 equivalent to about 1 equivalent of boron compound per equivalent of basic nitrogen or hydroxyl in the compositions of this invention may be employed.

LUBRICATING OIL COMPOSITIONS AND CONCENTRATES

The compositions of this invention are useful as detergent and dispersant additives in lubricating oils. In general, when employed in crankcase oils they are usually present from about 1 to about 10 percent by weight (on an actives basis) of the total composition, and preferably less than about 5 percent by weight (on an actives basis). Actives basis indicates that only the active ingredients of this invention are considered when determining the amount of the additive relative to the remainder of a composition. Diluents and any other inactives, such as unreacted polyalkene, are excluded. Unless otherwise indicated, in describing the lubricating oil and final compositions or concentrates, active ingredient contents are intended with respect to the polysuccinimides.

The lubricating oil used with the additive compositions of this invention may be mineral or synthetic oils of lubricating viscosity and preferably suitable for use in the crankcase of an internal combustion engine. Crankcase lubricating oils typically have a viscosity of about 1300 cSt at 0° F. (−17.8° C.) to 22.7 cSt at 210° F. (99° C.). Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include polymers of alpha olefins having the proper viscosity. Especially useful are the hydrogenated liquid oligomers of $C_6$ to $C_{12}$ alpha olefins, such as 1-decene trimer. Likewise, alkyl benzenes of proper viscosity such as didodecyl benzene can be used. Useful synthetic esters include the esters of both monocarboxylic acids and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils and synthetic oils are also useful. For example, blends of 10 to 25 weight percent hydrogenated 1-decene trimer with 75 to 90 weight percent 150 SUS (100° F.) mineral oil gives an excellent lubricating oil base.

Other additives which may be present in the formulation include detergents (overbased and non-overbased), rust inhibitors, foam inhibitors, metal deactivators, pour point depressants, antioxidants, wear inhibitors, zinc dithiophosphates and a variety of other well known additives.

It is also contemplated that the polysuccinimides of this invention may be employed as dispersants and detergents in hydraulic fluids, marine crankcase lubricants and the like. In general, when so employed, the polysuccinimide is added at from 0.1 to 5 percent by weight (on an active polysuccinimide basis) to the oil, and preferably at from 0.5 to 5 weight percent (on an active polysuccinimide basis).

Additive concentrates are also included within the scope of this invention. The concentrates of this invention usually include from 90 to 10 percent, preferably 20 to 60 weight percent, of an organic liquid diluent and from 10 to 90 weight percent, preferably 80 to 40 weight percent, (on a dry basis) of the additive of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 1300 cSt at 0° F. (−17.8° C.) to 22.7 cSt at 210° F. (99° C.), although an oil of lubricating viscosity can be used.

FUEL COMPOSITIONS AND CONCENTRATES

When used in fuels, the proper concentration of the additive that is necessary to achieve the desired detergency is dependent upon a variety of factors including the type of fuel used, the presence of other detergents or dispersants or other additives, etc. Generally, however, the range of concentration of the additive in the base fuel is 10 to 10,000 weight parts per million, preferably from 30 to 5,000 parts per million of the additive. If other detergents are present, a lesser amount of the additive may be used. The additives described herein may be formulated as a fuel concentrate, using an inert stable oleophilic solvent boiling in the range of about 150–400° F. (65.6–204.4° C.). Preferred solvents boil in the gasoline or diesel fuel range. Preferably, an aliphatic or an aromatic hydrocarbon solvent is used, such as a benzene, toluene, xylene or higher-boiling aromatics or aromatic thinners. Aliphatic alcohols of about 3 to 8 carbon atoms, such as isopropanol, isobutylcarbinol, n-butanol and the like in combination with hydrocarbon solvents are also suitable for use with the fuel additive. In the fuel concentrate, the amount of the additive will be ordinarily at least 5 percent by weight and generally not exceed 70 percent by weight, preferably from 5 to 50 and more preferably from 10 to 25 weight percent.

EXAMPLES

The invention will be further illustrated by the following examples, which set forth particularly advantageous method embodiments. While the Examples are provided to illustrate the present invention, they are not intended to limit it.

Example 1

Preparation of PolyPIBSA

PolyPIBSA was prepared using the following procedure. To a 12L three neck flask equipped with a heating mantle, temperature probe, nitrogen inlet tube, and an addition funnel, was added at 110° C. 5068 g (2.197 mol) Glissopal 2300 (high methylvinylidene polybutene from BASF; $M_n$=2300), and 215.2 g maleic anhydride (2.195 mol). The polyisobutene/maleic anhydride charge mole ratio ("CMR") was 1.0. To this was added over 2 hours a total of 16.1 g di-tert-butylperoxide (0.11 mol) dropwise with stirring. The di-tert-butylperoxide/polyisobutene CMR was 0.05. The temperature of the reaction was increased to 170° C. over one hour time period as the peroxide addition began. This was then heated overnight at 170° C. and then unreacted maleic anhydride was distilled under vacuum. The product was then filtered. The polyPIBSA product had a SAP number of 26.2 mg KOH/g sample, and contained 53.1 % actives. The apparent succinic ratio was 1.06.

The "succinic ratio" refers to the ratio calculated in accordance with the procedure and mathematical equation set forth in columns 5 and 6 of U.S. Pat. No. 5,334,321, issued Aug. 2, 1994 to Harrison and Ruhe, which is hereby incorporated by reference in its entirety. Normally, the term apparent succinic ratio refers to the number of succinic groups per polybutene tail. However, in the context of this application the apparent succinic ratio has a different meaning depending on the structure of the mixture. For a sample of polyPIBSA (case no. 1), the apparent succinic ratio refers to the ratio of succinic anhydride to polybutene tails that are present in the copolymer. For acid catalyzed thermal PIBSA (case no. 2), the apparent succinic ratio refers to the ratio of the succinic anhydride in the PIBSA plus the succinic anhydrides in the soluble resin to the polybutene tails in the PIBSA. For a mixture of polyPIBSA and acid catalyzed thermal PIBSA, the apparent succinic ratio refers to a combination of case no.1 and case no. 2 above.

Examples 2–5

Other preparations of polyPIBSA were carried out using the procedure of Example 1 with different temperatures and dicumylperoxide (DCP) instead of di-tert-butylperoxide (DTBP). These are reported in Table 1.

TABLE 1

Preparation of polyPIBSA samples

| Example | Peroxide | Temp., °C. | Saponification No., mgKOH/g sample | % Actives | Apparent Succinic Ratio |
|---|---|---|---|---|---|
| 1 | DTBP | 170 | 26.2 | 53.1 | 1.06 |
| 2 | DTBP | 170 | 27.3 | 55.2 | 1.06 |
| 3 | DCP | 160 | Na | 60.8 | Na |
| 4 | DCP | 160 | Na | 60.4 | Na |
| 5 | DCP | 160 | 29.7 | 59.3 | 1.07 |

Example 6

Preparation of PolyPIBSA/sulfonic Acid Catalyzed Thermal PIBSA Mixture

To 2800 g of the polyPIBSA mixture prepared in Example 1, heated to 232° C. and pressurized to 24.7 psia with nitrogen, was added 308 g maleic anhydride over 30 minutes. Then to this was added 0.7 g alkylbenzene sulfonic acid. The amount of sulfonic acid added relative to the amount of polyisobutene was about 250 ppm. This was then heated for four hours at 232° C. at 24.7 psia. Then vacuum was applied to the reactor and the excess maleic anhydride was distilled. The product, which had crude sediment of 1.5 wt. %, was then filtered. The polyPIBSA/PIBSA mixture had a SAP number of 71.0 mg KOH/g sample, and 89.0% actives. The calculated apparent succinic ratio was 1.76.

Example 7

Preparation of PolyPIBSA/sulfonic Acid Catalyzed Thermal PIBSA Mixture

To 4840 g of the polyPIBSA mixture prepared in Example 5 was added 519 g maleic anhydride, and 1.4 g alkylbenzene sulfonic acid as in Example 6. The amount of sulfonic acid added relative to the amount of polyisobutene was about 250 ppm. The same temperature, pressure and time were used as in Example 6. After distillation of the excess maleic anhydride, and filtration of the product a polyPIBSA/PIBSA mixture was obtained that had a SAP number of 62.9 mg KOH/g sample and 91.1% actives. The calculated apparent succinic ratio was 1.51.

The following examples describe the preparation of succinimides made from the polyPIBSA/sulfonic acid-catalyzed thermal PIBSA mixture.

Example 8

Preparation of the bis Heavy Polyamine Derivative of the PolyPIBSA/sulfonic Acid-catalyzed Thermal PIBSA To 225.70 g of the polyPIBSA/PIBSA mixture from Example 6 (0.143 mol) was added at 130° C. 19.63 g HPA (0.0714 mol, a heavy polyamine $M_n$=275, which contains about 6.5 nitrogen atoms per mole), and 276.48 g diluent oil. The amine/anhydride CMR was 0.5. This was heated to 165° C. After heating for 72 hours, the reaction was cooled. The product had 1.26% N, a Total Base Number ("TBN") of 26.1 mgKOH/g sample, a Total Acid Number ("TAN") of 0.83 mgKOH/g sample, and a viscosity @ 100° C. of 150.5 cSt.

Example 9

Preparation of Other Succinimides

The procedure of Example 8 was followed except that TETA was used instead of HPA. The chemical and physical properties for this product is included in Table 2.

TABLE 2

Preparation of polyPIBSA/PIBSA succinimides.

| Example | PolyPIBSA/PIBSA example | CMR | Amine | % N | TBN | TAN | Viscosity @ 100° C. |
|---|---|---|---|---|---|---|---|
| 8 | 6 | 0.5 | HPA | 1.26 | 26.1 | 0.83 | 150.5 |
| 9 | 6 | 0.5 | TETA | 0.755 | 11.5 | 1.68 | 146 |

The following examples describe the preparation of ethylene carbonate post treated dispersants.

Example 10

Ethylene Carbonate Post Treatment of PolyPIBSA/PIBSA Succinimides

The polyPIBSA/PIBSA succinimides were post treated with ethylene carbonate according to the following procedure. To a three neck flask equipped with a stirrer, heating mantle, and a nitrogen inlet tube, was added 202.23 g of the polyPIBSA/PIBSA succinimide from Example 8. This was heated to 165° C. and to this was added 22.36 g ethylene carbonate. This was heated overnight and then cooled. This product had 1.20% N, 14.9 TBN, <0.05 TAN, and a viscosity @ 100° C. of 353 cSt.

Example 11

Ethylene Carbonate Post Treatment of Succinimide from Example 9

To 220.14 g of the succinimide from Example 9 was added 10.44 g ethylene carbonate at 165° C. with stirring. This was heated overnight and then cooled. This product had 0.732% N, 6.67 TBN, 0.16 TAN, and a viscosity @ 100° C. of 175 cSt.

Example 12

Preparation of Ethylene Carbonate Post Treated Succinimide Using HPA

To 1049.28 g of the polyPIBSA/PIBSA mixture from Example 7 was added 950.72 g diluent oil and 80.87 g HPA (0.294 mol) at 130° C. The amine/PIBSA ratio was 0.5. This was heated with stirring to 165° C. overnight. Then to this was added 247.59 g ethylene carbonate (2.81 mol). The ethylene carbonate/basic nitrogen CMR was 2.0. This was heated at 170° C. for 6 hours. This product had 1.23% N, 0.08 TAN, 16.7 TBN, and had a viscosity @ 100° C. of 753 cSt.

Example 13

Preparation of Ethylene Carbonate Post Treated Succinimide Using HPA

To 47,862 g polyPIBSA/PIBSA mixture which had a SAP number of 32.2 mg KOH/g sample, (13.73 mol) was added 1888 g HPA (6.87 mol) at 120° C. with stirring. The amine/PIBSA CMR was 0.5. This was heated at 165° C. for 6 hours. Then to this was added 5775 g ethylene carbonate (65.6 mol). The ethylene carbonate/basic nitrogen CMR was 2.0. This was heated at 165° C. overnight. The resulting product (52,988 g) had 1.22% N, 16.1 TBN and viscosity @ 100° C. of 732 cSt.

The succinimides can be "end-capped" by reacting terminal reactive amines from the polyamine with an endcapping agent. This can be accomplished by adding the end capping agent to the succinimide under reactive conditions, or by adding the endcapping agent to the polyPIBSA, followed by addition of the polyamine, also under reactive conditions. Examples of end capping agents include low molecular weight alkyl succinic anhydrides. Preferably, the alkyl chain is relatively short, which helps maintain a high percent nitrogen in the endcapped product. Conditions for the end capping reaction are typically similar to those employed in the imidation of the polyPIBSA.

The following examples describe the preparation of the $C_{12}$ end capped succinimides.

Example 14

Preparation of the $C_{12}$ end Capped HPA Succinimide

To 207.15 g of polyPIBSA/PIBSA mixture from Example 6 (0.131 mol) was added 15.8 g tetrapropenylsuccinic anhydride (TPSA; 0.0563 mol) and 253.77 g diluent oil. This was stirred at 100° C. for 1 hour. The polyPIBSA/PIBSA: TPSA ratio was 70/30. To this was added 25.8 g HPA (0.0938 mol) and then the reaction temperature was increased to 165° C. This was heated overnight. The product was then cooled. The resulting product had 1.72% N, 36.4 TBN, 0.75 TAN, and had a viscosity @ 100° C. of 136 cSt.

Example 15

Ethylene Carbonate Post Treatment of Succinimide from Example 14

To 197.77 g of the succinimide from Example 14 was added at 165° C., 29.85 g ethylene carbonate (0.34 mol). This was heated overnight at 165° C. The resulting product had 1.59% N, TBN of 21.1, a TAN of <0.05, and a viscosity @ 100° C. of 473 cSt.

Example 16

Preparation of EC Post Treated $C_{12}$ end Capped HPA Succinimide

To 632.23 g polyPIBSA/PIBSA mixture which had a SAP number of 60.5 mg KOH/g sample, was added 1617 g diluent oil. To this was then added 95.6 g TPSA (SAP number 400 mg KOH/g sample, 0.34 mol). The polyPIBSA/PIBSA: TPSA CMR was 1.0. To this was then added 93.73 g (0.34 mol). The amine/PIBSA CMR was 1.0. This was heated at 170° C. for 6 hours and then cooled. To the resulting product was then added at 100° C., 286.98 g ethylene carbonate (3.26 mol). This was heated to 170° C. for 7 hours. The EC/basic nitrogen CMR was 2.0. The product from this reaction contained 1.15% N, 15.9 TBN, 0.15 TAN, and had a viscosity @ 100° C. of 86.1 cSt.

Example 17

Preparation of EC Post Treated $C_{12}$ end Capped HPA Succinimide

To 42,043 g polyPIBSA/PIBSA mixture which had a SAP number of 21.0 mg KOH/g sample (7.87 mol) was added 2166 mol TPSA (7.83 mol) and this was heated to 165° C. To this was added with stirring 2154 g HPA (7.83 mol). This was heated for 6 hours. To this was then added 6589 g ethylene carbonate (74.88 mol). This was heated at 165–170° C. overnight. This product (48,746 g) had 1.52 % N, 19.1 TBN, and had a viscosity @100° C. of 155.1 cSt.

PERFORMANCE TESTING

The soot thickening test was used to determine the relative performance of the new dispersant variants. Details of the soot thickening test are included in U.S. Pat. No. 5,821,205. The results from the soot thickening test are included in Table 3.

TABLE 3

Soot thickening test data for new dispersants

| Example | Amine | EC/basic N CMR | polyPIBSA/PIBSA:TPSA ratio | % viscosity increase |
|---|---|---|---|---|
| 8 | HPA | 0 | — | 86 |
| 9 | TETA | 0 | — | 174 |
| 10 | HPA | 2 | — | 24 |
| 11 | TETA | 2 | — | 46 |
| 14 | HPA | 0 | 70/30 | 48 |
| 15 | HPA | 2 | 70/30 | 20 |

The data in Table 3 shows that for the soot thickening tests HPA gives better performance than TETA. Also the EC post-treated materials give better performance than the non-EC treated samples.

What is claimed is:

1. A process for preparing a mixture of (1) a copolymer of a polyalkene and an unsaturated acidic reagent and (2) a polyalkenyl derivative of an unsaturated acidic reagent, said process comprising
   (a) copolymerizing (1) a polyalkene containing alkylvinylidene isomer and non-alkylvinylidene isomers and (2) an unsaturated acidic reagent under polymerization conditions in the presence of a free radical initiator; and
   (b) reacting the product of step (a) with an unsaturated acidic reagent at elevated temperature in the presence of a strong acid.

2. A process according to claim 1 wherein said polyalkene is a polybutene.

3. A process according to claim 2 wherein said polybutene is a polyisobutene.

4. A process according to claim 3 wherein at least 50% of said polyisobutene has methylvinylidene end groups.

5. A process according to claim 1 wherein said polyalkene has a Mn of from 500 to 2500.

6. A process according to claim 1 wherein said unsaturated acidic reagent is maleic anhydride.

7. A process according to claim 1 wherein said strong acid is a sulfonic acid.

8. A process according to claim 7 wherein said sulfonic acid is an alkyl aryl sulfonic acid.

9. A process according to claim 8 wherein said alkyl group of said alkyl aryl sulfonic acid has from 4 to 30 carbon atoms.

10. A process according to claim 7 wherein the sulfonic acid is present in an amount in the range of from 0.0025% to 1.0% based on the total weight of polyalkene.

11. The product produced by a process comprising:
   (a) copolymerizing (1) a polyalkene containing alkylvinylidene isomer and non-alkylvinylidene isomers and (2) an unsaturated acidic reagent under polymerization conditions in the presence of a free radical initiator; and (b) reacting the product of step (a) with an unsaturated acidic reagent at elevated temperature in the presence of a strong acid.

12. A composition produced by strong acid catalysis comprising a mixture of (1) a copolymer of a polyalkene and an unsaturated acidic reagent and (2) a polyalkenyl derivative of an unsaturated acidic reagent wherein the weight ratio of copolymer to polyalkenyl derivative is about 0.1–10.

13. The composition of claim 12 wherein the weight ratio of copolymer to polyalkenyl derivative is about 0.2–5.0.

14. The composition of claim 12 wherein the weight ratio of copolymer to polyalkenyl derivative is about 1–2.

15. A polysuccinimide prepared by reacting a mixture according to claim 12 with an amine, a polyamine having at least two basic nitrogens, or mixtures thereof.

16. A concentrate comprising 10 to 90 weight percent of a polysuccinimide of claim 15 and from 90 to 10 weight percent of an organic diluent.

17. A lubricating oil composition comprising a major amount of an oil of lubricating viscosity and a minor amount of a polysuccinimide of claim 15.

18. A post-treated composition prepared by treating a polysuccinimide of claim 15 under reactive conditions with a cyclic carbonate.

19. The post-treated composition of claim 18 wherein the cyclic carbonate is ethylene carbonate.

20. A post-treated composition prepared by treating a polysuccinimide of claim 15 under reactive conditions with a boron compound.

21. The post-treated composition of claim 18 wherein the boron compound is boric acid.

22. A lubricating oil composition comprising a major amount of an oil of lubricating viscosity and a minor amount of the post-treated composition of claim 18.

23. A concentrate comprising 10 to 90 weight percent of a post-treated composition of claim 18 and from 90 to 10 weight percent of an organic diluent.

24. A fuel composition comprising a hydrocarbon boiling in the gasoline or diesel range and from about 10 to about 10,000 parts per million of post-treated composition of claim 18.

25. A fuel concentrate comprising an inert, stable oleophilic solvent boiling in the range of 150–400° F. and at least 5 percent by weight of the post-treated composition of claim 18.

26. A polyester prepared by reacting a mixture according to claim 12 with a polyol.

27. A concentrate comprising 10 to 90 weight percent of a polyester of claim 26 and from 90 to 10 weight percent of an organic diluent.

28. A lubricating oil composition comprising a major amount of an oil of lubricating viscosity and a minor amount of a polyester of claim 26.

29. A post-treated composition prepared by treating a polyester of claim 26 under reactive conditions with a boron compound.

30. The post-treated composition of claim 29 wherein the boron compound is boric acid.

* * * * *